US007600200B2

(12) United States Patent
K et al.

(10) Patent No.: US 7,600,200 B2
(45) Date of Patent: Oct. 6, 2009

(54) DISPLAY OF HISTORICAL INFORMATION RELATED TO FIELD DEVICES USED IN PROCESS CONTROL PLANTS

(75) Inventors: Patra Surjya Narayana K, Bangalore (IN); Raghavendra T. S. Prasad, Bangalore (IN); Amit Nigam, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 497 days.

(21) Appl. No.: 11/145,735

(22) Filed: Jun. 6, 2005

(65) Prior Publication Data

US 2006/0218507 A1 Sep. 28, 2006

(30) Foreign Application Priority Data

Mar. 28, 2005 (IN) .......................... 315/CHE/2005

(51) Int. Cl.
*G06F 3/048* (2006.01)
(52) U.S. Cl. ........................ 715/853; 715/810; 715/771; 715/854; 700/17; 700/65; 700/83
(58) Field of Classification Search ................. 715/825, 715/810, 771, 853, 854; 705/28; 700/17, 700/83, 65
See application file for complete search history.

(56) References Cited

U.S. PATENT DOCUMENTS 4,718,025 A 1/1988 Minor et al.
5,369,756 A * 11/1994 Imura et al. .................... 714/26
5,960,214 A * 9/1999 Sharpe et al. .................. 710/15
6,298,377 B1 * 10/2001 Hartikainen et al. ........ 709/223
6,421,571 B1 7/2002 Spriggs et al.
6,499,117 B1 * 12/2002 Tanaka ......................... 714/49
6,618,630 B1 * 9/2003 Jundt et al. .................... 700/17
6,701,284 B1 3/2004 Huntley et al.
7,143,153 B1 * 11/2006 Black et al. ................. 709/223
2003/0028823 A1 * 2/2003 Kallela et al. ................. 714/26
2004/0158583 A1 * 8/2004 Kaappa ..................... 707/104.1
2004/0230328 A1 * 11/2004 Armstrong et al. ............ 700/83
2004/0250227 A1 * 12/2004 Lin ............................... 716/7

FOREIGN PATENT DOCUMENTS

EP 0962845 A2 12/1999

OTHER PUBLICATIONS

Lobashov M. et al., Applicability of Internet Protocols for Fieldbus Access, IEEE Factory Communications Systems, Aug 2002, pp. 205-213, Piscataway, NJ.

* cited by examiner

*Primary Examiner*—Weilun Lo
*Assistant Examiner*—Tuyetlien T Tran
(74) *Attorney, Agent, or Firm*—Naren Thappeta (57) ABSTRACT

A management system (managing field devices of a process control plan) provided according to an aspect of the present invention enables a user to view historical menus (i.e., the menus as displayed at desired prior time points). Such a feature is enabled in an embodiment by storing displayed tree structure as well as associated item values.

17 Claims, 9 Drawing Sheets

```
401A    IMPORT STANDARD _MENU, DEVICE_REVISION 1, DD_REVISION 1
402A    {
403A      MENU root_menu;
404A      REDEFINITIONS
405A      {
406A        MENU root_menu
407A        {
408A          REDEFINE LABEL "Online";
409A          REDEFINE ITEMS
410A          {
411A            Patent,
412A            pos_serial_number
413A          }
414A        }
415A      }
416A    }
417A
418A      MENU Patent
419A      {
420A        LABEL "PatentTest";
421A        ITEMS
422A        {
423A          menu_test1,
424A          menu_test2,
425A          menu_test3,
426A          menu_test4
427A        }
428A      }
429A
430A      MENU menu_test1
431A      {
432A        LABEL
433A          IF (pos_serial_number == 1)
434A          {
435A            "MENU1";
436A          }
437A          ELSE
438A          {
439A            "Menu not available";
440A          }
441A
442A        ITEMS
443A        {
444A          pos_value
445A        }
446A      }
```

*FIG. 4A*

```
401B    MENU menu_test2
402B    {
403B        LABEL
404B            IF (pos_serial_number == 1)
405B            {
406B                "MENU2";
407B            }
408B            ELSE
409B            {
410B                "Menu not available";
411B            }
412B        ITEMS
413B        {
414B            pos_value
415B        }
416B    }

418B    MENU menu_test3
419B    {
420B        LABEL
421B            IF (pos_serial_number == 2)
422B            {
423B                "MENU3";
424B            }
425B            ELSE
426B            {
427B                "Menu not available";
428B            }
429B        ITEMS
430B        {
431B            pos_value
432B        }
433B    }

435B    MENU menu_test4
436B    {
437B        LABEL
438B            IF (pos_serial_number == 2)
439B            {
440B                "MENU4";
441B            }
442B            ELSE
443B            {
444B                "Menu not available";
445B            }
446B        ITEMS
447B        {
448B            pos_value
449B        }
450B    }
```

*FIG. 4B*

```
401C  VARIABLE private_label_distributor
402C  {
403C      REDEFINE TYPE ENUMERATED
404C      {
405C          (23, "Vendor")
406C      }
407C  }

409C  VARIABLE pos_value
410C  {
411C      HELP "Position Value: Primary Value representing the Actuator output shaft Position.";
412C      CLASS CORRECTION & DYNAMIC;
413C      LABEL "Position";
414C      HANDLING READ;
415C      TYPE FLOAT
416C      {
417C          DISPLAY_FORMAT ".2f";
418C      }
419C  }

421C  VARIABLE pos_serial_number
422C  {
423C      HELP "Patent Serial Number: Unique identifier for H-FDCM.";
424C      CLASS DEVICE;
425C      LABEL "Patent s/n";
426C      HANDLING READ & WRITE;
427C      TYPE UNSIGNED_INTEGER(3)
428C      {
429C              DISPLAY_FORMAT "7d";
430C              EDIT_FORMAT "7d";
431C      }
432C  }
```

DISPLAY OF HISTORICAL INFORMATION RELATED TO FIELD DEVICES USED IN PROCESS CONTROL PLANTS

RELATED APPLICATIONS

The present application is related to and claims priority from the co-pending India Patent Application entitled, "Display of Historical Information Related to Field Devices Used in Process Control Plants", Ser. No: 315/CHE/2005, Filed: 28 Mar. 2005, naming the same inventors as in the subject patent application.

The present application is also related to the following co-pending US Applications, which are filed on even date herewith, and are incorporated in their entirety herewith:

1. Entitled, "Simplifying Integration of Field Devices Accessible by Different Network Protocols into a Field Device Management System", Ser. No. 11/145,746, Filed: 6 Jun. 2005, Publication Number: , published: , Inventors: MARANAT et al; and 2. Entitled, "Presenting Status Information of Field Devices in Process Control Plants", Ser. No. 11/145,734, Filed: 6 Jun. 2005, Publication Number: , published: , Inventors: RAMANATHAN et al.

BACKGROUND OF THE INVENTION

1. Field of the Invention

The present invention generally relates to process control systems, and more specifically to a method and apparatus for displaying historical information related to field devices used in process control plants.

2. Related Art

A process control plant generally contains several field devices, which are controlled to implement a desired control process. To enable such control, each field device contains components such as sensors (which measure various variables such as temperature, flow, pressure, etc.), control elements (e.g., valves, switches), and transmitters (which transmit any desired information to a processing system, which controls the manufacturing process). For example, field devices containing pressure sensors may be monitored and valves controlled to maintain the pressure level in a boiler (in general equipment) at a desired value.

There has been a general recognised need to monitor the status of the field devices, at least during the operation of a plant. Typically, a monitoring system is provided to receive and display the status information. The monitoring system may contain a central server which receives the status information, and several client systems may be provided which retrieve and display the status information according to a suitable user interface.

Field device vendors often provide a device description (DD), which contains various information elements of interest. Each information element contains some or more of attributes such as the type (e.g., dynamic variable, static variable, menu, etc.) of the element, the identifier, label, description, relationship with other information elements, etc. In the embodiments described below, the relationships are defined to organize the information elements according to a tree structure, which can be hierarchically navigated to view the present values corresponding to desired information elements of interest.

The tree structure can be different at different time instances. For example, in the case of DDs noted above, different tree structures are valid for different values of a dynamic variable. The monitoring system generally displays a menu representing the tree structures and a user may navigate and select different information elements of interest from the displayed menu to view the corresponding value during operation of the plant.

There is also a general recognised need to view historical information relating to the status of field devices. It is desirable that a user be provided at least as much information as is being provided (or available) during the operation of the plant.

SUMMARY

An aspect of the present invention enables a user to view historical menus representing the status of a field device of interest. In one embodiment, a client system receives from a user inputs indicating a time point, a tree portion (menu), and a field device of interest. The client system then receives from a data storage data representing a tree structure corresponding to the tree portion at the time point for the field device, and displays the tree structure as a menu. The displayed menu is identical to a menu displayed at the time point according to an aspect of the present invention.

According to one more aspect of the present invention, a server facilitates such display of historical menus by storing data representing the menu along with the values in a non-volatile storage such that said menu can be displayed later.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, which are described below briefly.

DETAILED DESCRIPTION

1. Overview

A monitoring system provided according to an aspect of the present invention displays menus that were applicable to a field device at a specified prior time. A user may thus indicate a time of interest and a field device of interest, view the menu that would have been displayed for the device at the specified time, and navigate the menu to view the value corresponding to a specific information element of interest.

In an embodiment, the entire tree structure (navigable by the displayed menu) and the values of information elements covered by the tree structure are stored, and made available for display as historical information. The tree structure (and values) may be stored when any variable value changes and/or at pre-specified intervals. A time stamp may be associated with each (instance of the) stored tree structure such that an appropriate menu (and corresponding values) can be displayed when a user specifies a time of interest.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
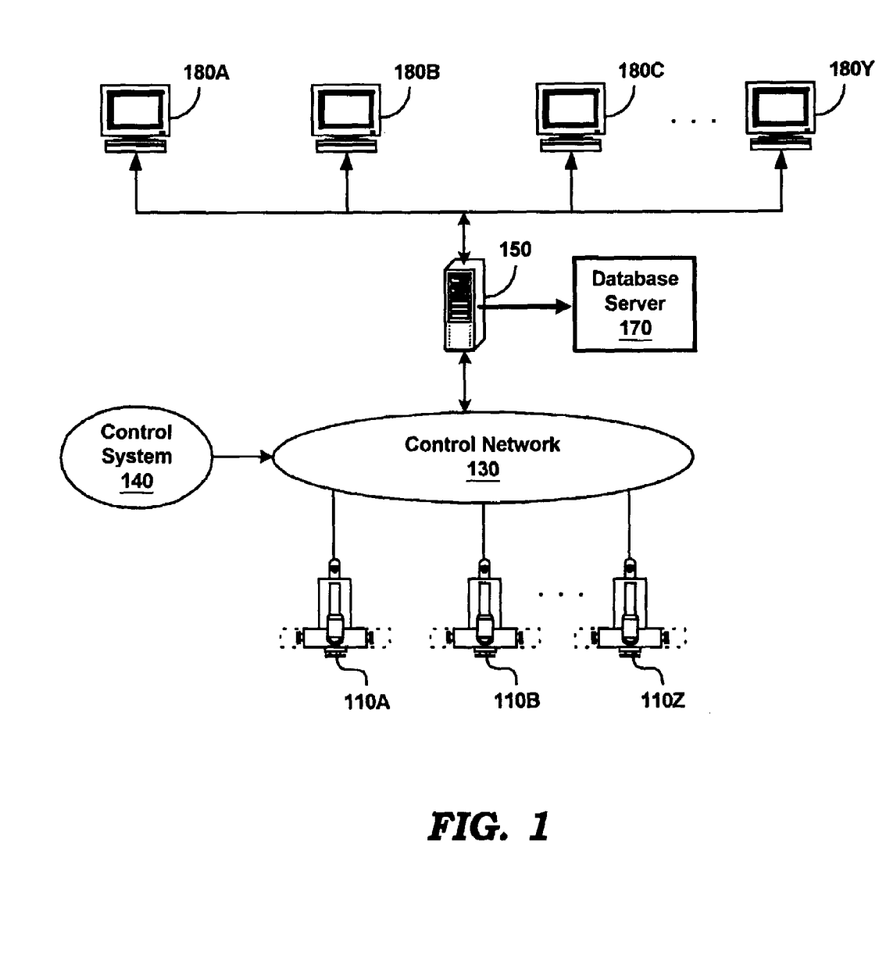
FIG. 1 is a block diagram illustrating an example environment in which various aspect of the present invention can be implemented.

FIG. 1 is a block diagram illustrating the details of an example environment in which several aspects of the present invention can be implemented. The block diagram is shown containing field devices 110A through 110Z, control network 130, control system 140, central server 150, database server 170, and client systems 180A through 180Y. Each block is described below in detail.

Control network 130 connects each of central server 150 and control system 140 with field devices 110A through 110Z. Control network 130 may contain network devices (e.g., multiplexors, modems, termination panels, etc.,) operating according to one or more protocols such as HART, Control Net, and Foundation Field Bus well known in the relevant arts.

Control system 140 issues commands to control the operation of field devices 110A through 110Z. The field devices are controlled to implement a desired control process (e.g., oil refinery, manufacturing plant). Database server 170 provides a central repository for storing information related to configuration of field devices, status of field devices, maintenance schedules, etc. In addition, database server 170 is used to store historical menu information as described in below sections in further detail.

Field devices 110A through 110Z perform various operations under the control of control system 140 to implement a desired manufacturing process. In addition (or as a part of supporting such a process), each field device may be implemented to support various management commands received from central server 150. Some of the management commands may merely request information (e.g., measured pressure), and some of the commands cause the configuration to be altered (e.g., a valve might be caused to be opened).

Client systems 180A through 180Y provide a user interface using which users may manage (view information or perform configuration) field devices 110A through 110Z. Each client system may subscribe to central server 150 for specific tree portion of interest (typically what a user has presently selected the tree portion), and receives the corresponding information from central server 150. Client systems 180A through 180Y, along with central server 150, forms an example embodiment of a monitoring system.

In one embodiment, client system 180A determines the information elements of interest by examining a local copy/file containing the device description of the subject field device, and generates the corresponding display. The manner in which the display is generated depends on whether the menu structures corresponding to the information elements are dynamic or not (i.e., static). In case of static information, client system 180A generates the corresponding display based on the information in the local DD file.

On the other hand, in case of dynamic menus, client system 180A may also specify (or subscribe to) the tree portion of interest to central server 150, and receive the entire tree to display as well as values of information elements accessible by the tree. The tree portion of interest is specified by appropriate unique identifiers of the corresponding information elements. The received information is displayed using a suitable user interface.

Central server 150 receives status information from various field devices 110A through 110Z through control network 130, and makes the information available to users via client systems 180A through 180Y. Commands may be issued to the field devices to retrieve the desired information. In an embodiment, information corresponding to only the subscribed information elements (including those covered by subscribed tree portions) is retrieved.

In an embodiment, in the case of tree portions subscribed to by a client system, central server 150 examines the tree portion of the DD for the corresponding field device type to determine the variables to be monitored to determine the structure of the corresponding dynamic menus. The corresponding values are retrieved from the subject field devices of interest. Central server 150 generates menu representing the tree structure and associates the retrieved values, and sends the resulting menu for display/navigation on the subscribing client system.

According to an aspect of the present invention, a monitoring system (containing central server 150 and client systems 180A-180Y in FIG. 1) enables display menus that were applicable to a field device at a specified prior time. The ability to view such historical information may simplify various operational aspects (e.g., trouble shooting, problem isolation, etc.).

The manner in which such historical information may be displayed is described below with respect to FIGS. 2 and 3. In particular, FIG. 2 relates to storing of historical data, and FIG. 3 relates to displaying the stored data.

3. Storing Historical Tree Information

Figure 2:
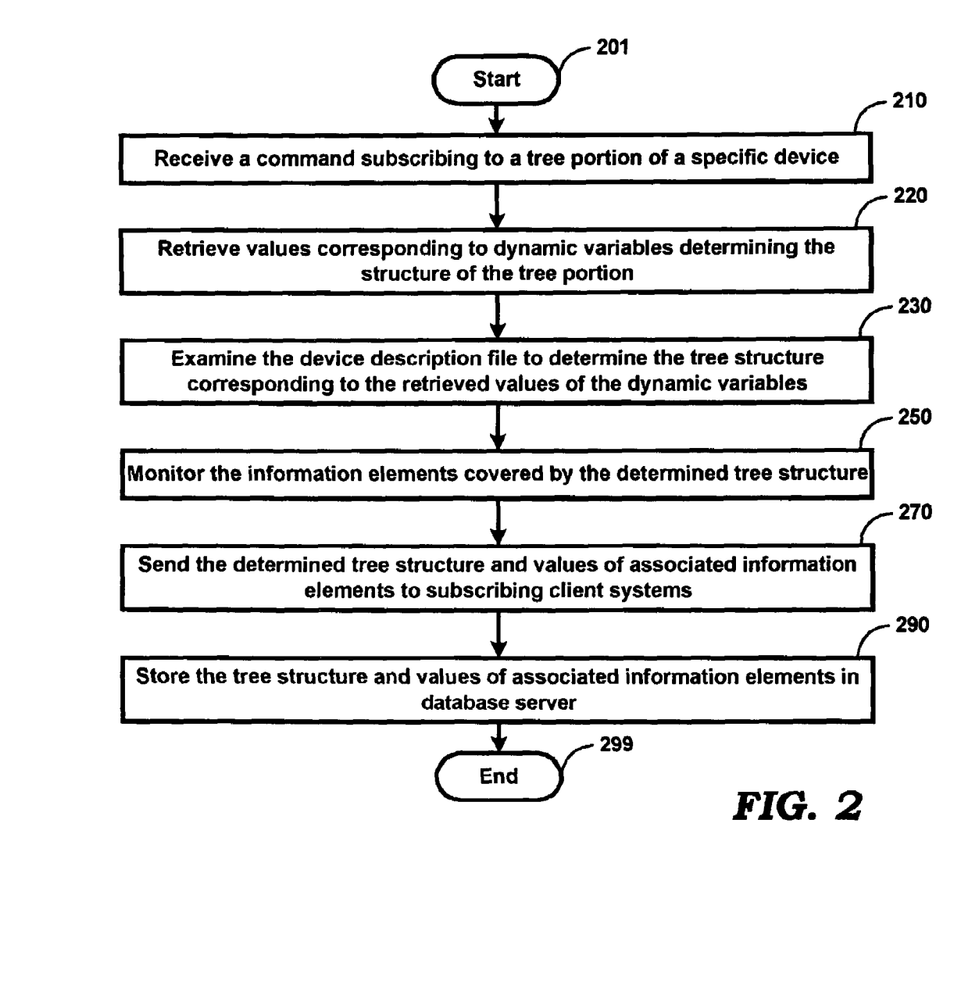
FIG. 2 is a flow chart illustrating the manner in which data can be stored enabling display of historical menus (i.e., menus as displayed at a prior time) according to an aspect of the present invention.

FIG. 2 is a flow chart illustrating the manner in which historical tree information can be stored according to an aspect of the present invention. The flowchart is described with respect to FIG. 1 merely for illustration. However, the approaches can be implemented in other environments by other types of systems as well. The flowchart begins in step 201, in which control transfers to step 210.

In step 210, central server 150 receives a command from client system 180A subscribing to a tree portion of a specific device of interest. The command can be received according to any pre-specified format/interface implemented by central server 150 and client system 180A.

In step 220, central server 150 retrieves values corresponding to information elements (or dynamic variables, in general) which would cause the structure of the tree to vary. As noted above, some tree portions will have different structures based on the then value of the dynamic variables. Accordingly, the values of such dynamic variables are retrieved from the field device of interest.

In step 230, central server 150 examines the device description file (DD) to determine the tree structure corresponding to the retrieved values of the information elements. As noted above, the DD file indicates the tree structure corresponding various values of the dynamic variables, and thus the DD file is examined to determine the tree structure.

In step 250, central server 150 monitors the information elements covered by the determined tree structure. In general, monitoring entails sending the appropriate commands to retrieve the corresponding values for dynamic variable. However, for static variables, prior information may be relied upon.

In step 270, central server 150 sends the determined tree structure and values of associated information elements (monitored in step 250) to subscribing client systems. Client system 180A displays a menu, which permits navigation of the tree portion using a suitable user interface. An example user interface is described below in further detail.

It should be understood that more than one client system may subscribe to the same tree structure, and accordingly central server 150 may send the same data to all such client systems. In addition, while the description above is provided with respect to monitoring only subscribed tree portions, alternative embodiments can be implemented which always monitors important (specified by a user configuration) tree portions.

In step 290, central server 150 stores the tree structure and values of associated information elements in database server 170. A time stamp indicating the time at which the data is stored or retrieved may also be stored. In an embodiment, the tree structure is stored periodically while the updates in (the memory of) central server 150 happen in parallel according to the requirements of the specific variables being monitored.

In general, at least the dynamic variables which change, need to be stored. In an embodiment described below, the (presently valid) tree structure (including the displayed labels, variable identifiers) is also stored such that later display is simplified. The flowchart ends in step 299.

The data thus stored according to FIG. 2 can be later viewed, and thus represents historical tree information. The stored information may then be made available to client systems 180A-180Y as described below in further detail with respect to FIG. 3.

4. Displaying Historical Tree Information

Figure 3:
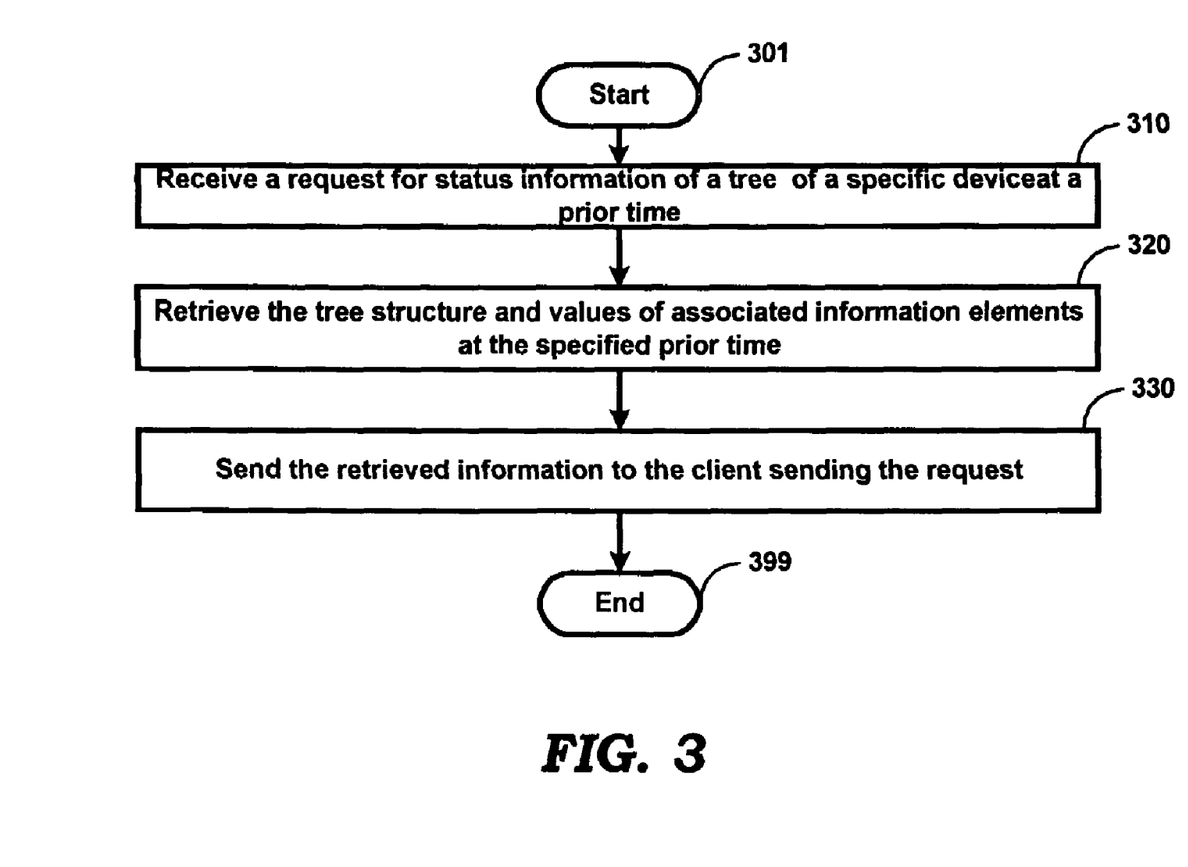
FIG. 3 is a flow chart illustrating the manner in which historical menus are displayed according to an aspect of the present invention.

FIG. 3 is a flowchart illustrating the manner in which the historical tree information may be displayed in an embodiment of the present invention. The flowchart is described with respect to FIGS. 1 and 2, also merely for illustration. However, the approach(es) can be implemented in other environments. The flowchart begins in step 301, in which control passes to step 310.

In step 310, central server 150 receives (from client system 180A) a request for status information of a tree (portion) of a device of interest at a prior time. Thus, historical information for the tree is said to be requested from client system 180A.

In step 320, central server 150 retrieves from database server 170 the tree structure and values of associated information elements at the specified prior time. In general, the retrieval needs to be consistent with the storage approach of step 290 described above.

In step 330, central server 150 sends the retrieved information to the client sending the request (in step 310). The information can be sent consistent with any pre-specified interface and protocol. The flowchart ends in step 399.

Thus, using the approaches described above, a monitoring system may display historical tree information to users. The approaches can be implemented in various environment. The implementation in an example environment will be clearer based on an understanding of the device description (DD) for an example field device and the corresponding dynamic menus, and accordingly a illustrative portion of a DD and corresponding dynamic menus are described below with respect to FIGS. 4A-4C and 5A-5B respectively.

5. Device Description and Corresponding Dynamic Trees

Figure 4A:
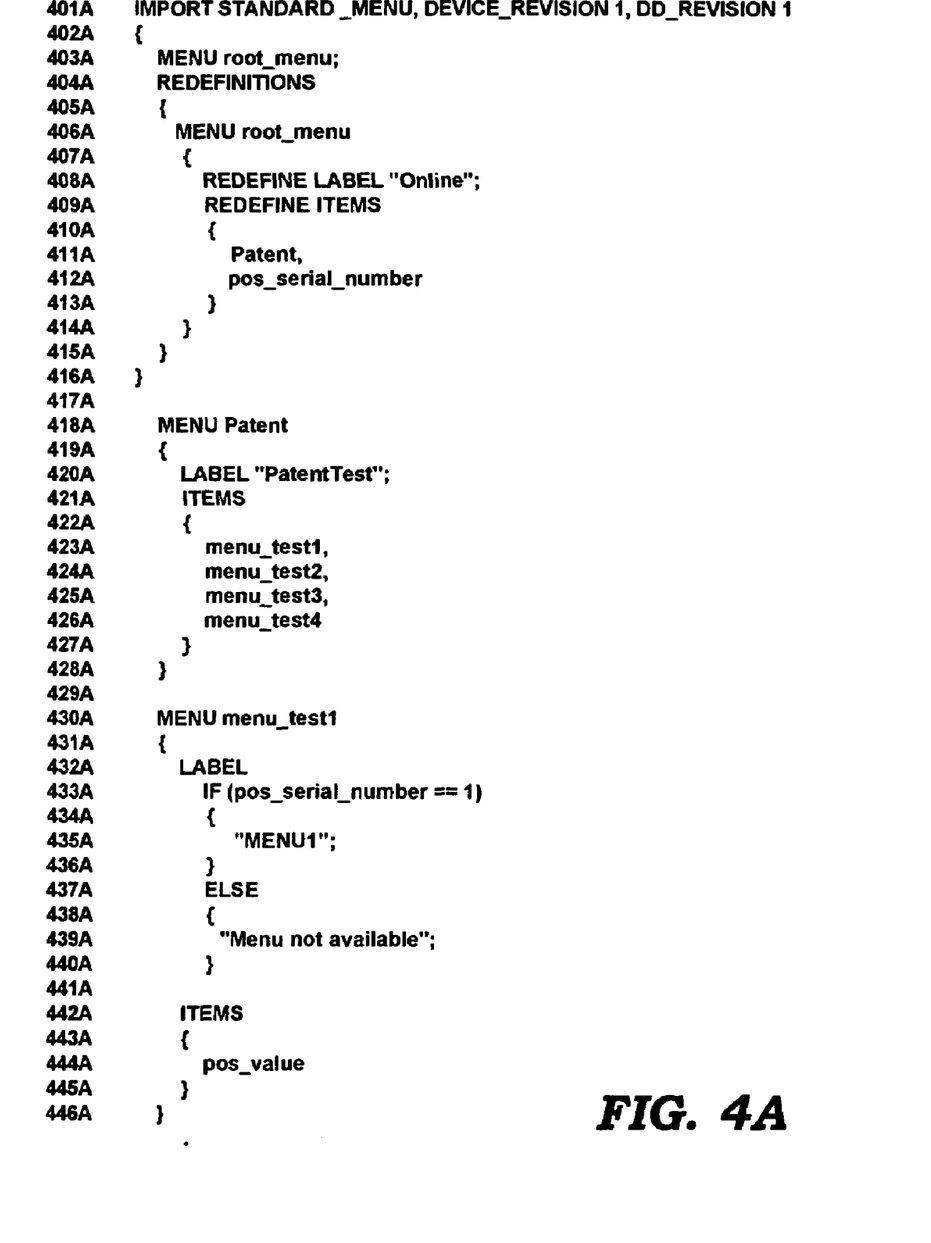
FIGS. 4A-4C contain a portion of the device description (DD) illustrating the manner in which dynamic menus (which are different at different time points) are defined in an embodiment.
Figure 4B:
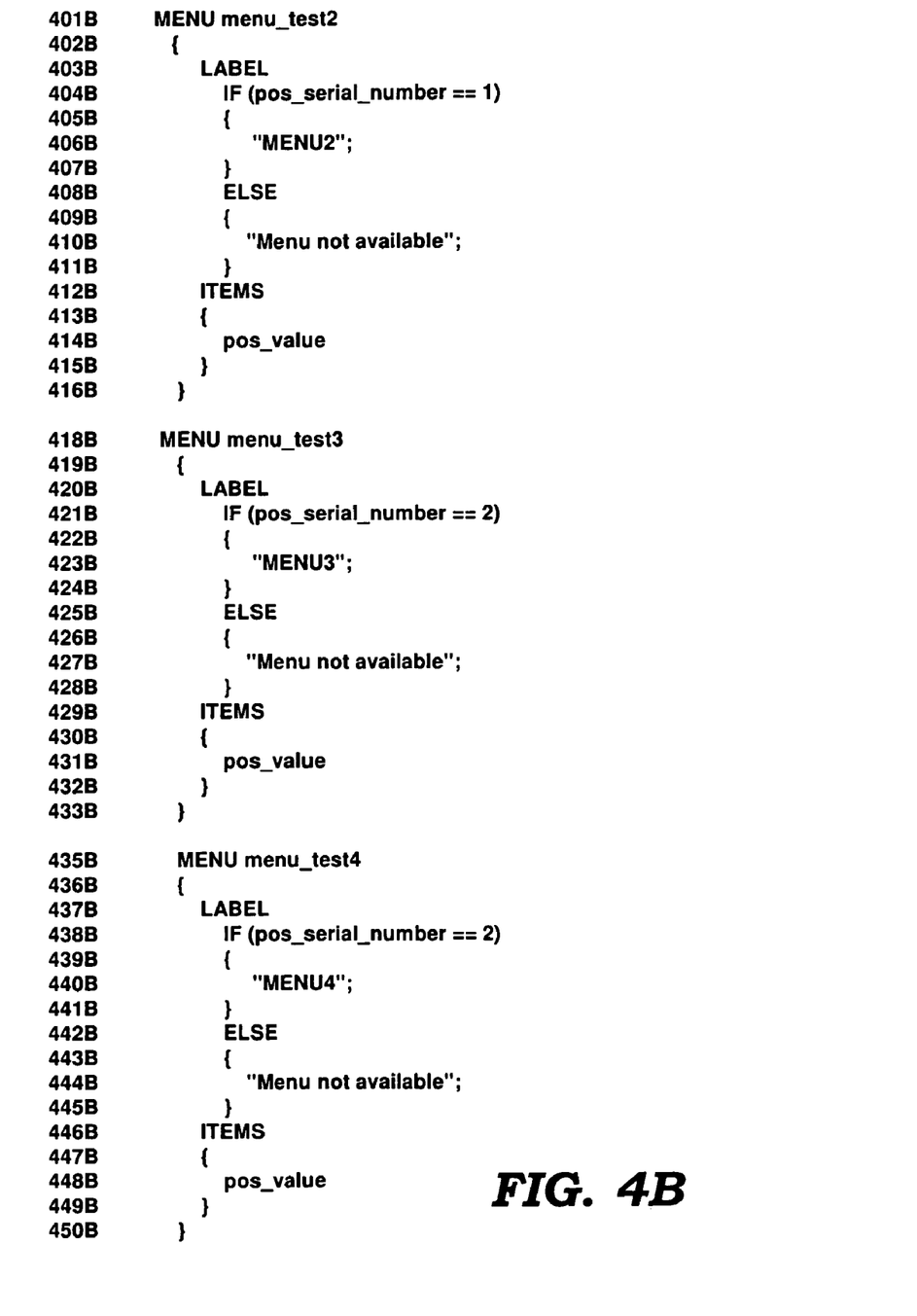
Figure 4C:
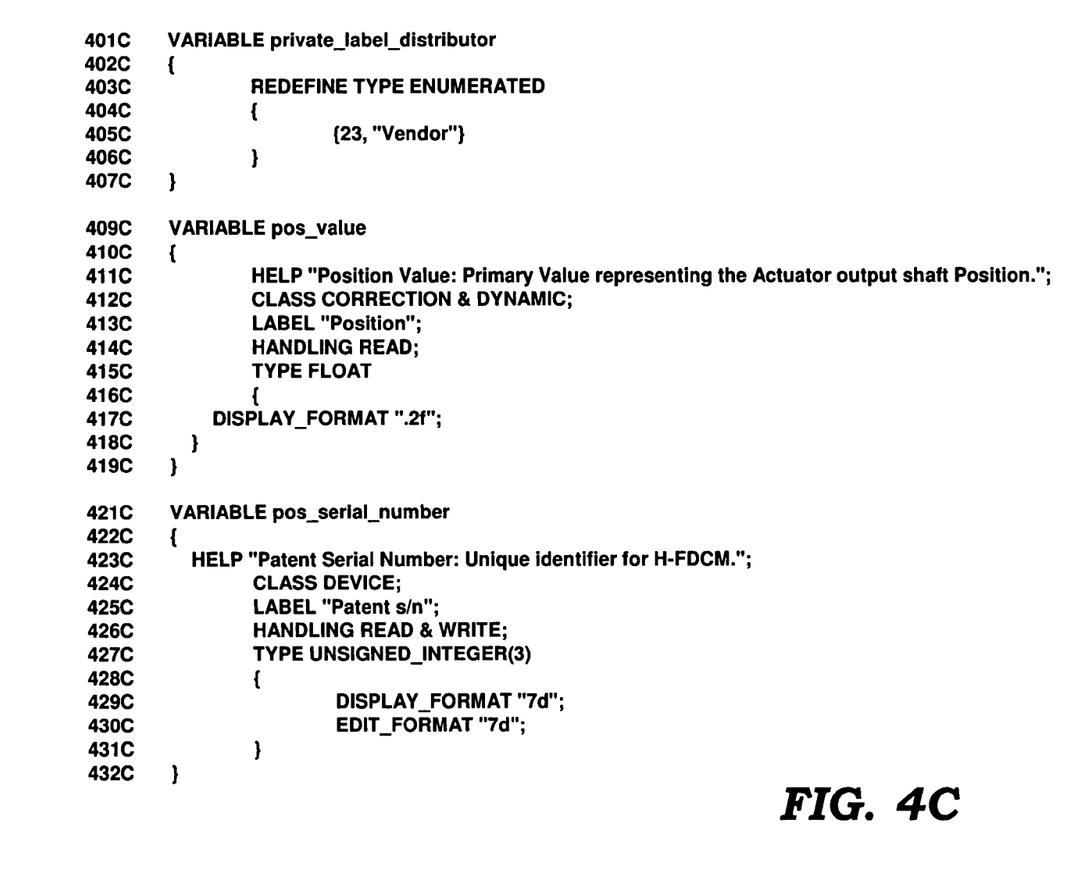

FIGS. 4A-4C together contain a device description (DD) portion illustrating the manner in which dynamic menus are generated. The corresponding dynamic menus are illustrated with respect to FIGS. 5A and 5B. It is noted that the reference numerals in FIGS. 4A, 4B and 4C respectively end with A, B and C.

Figure 5A:
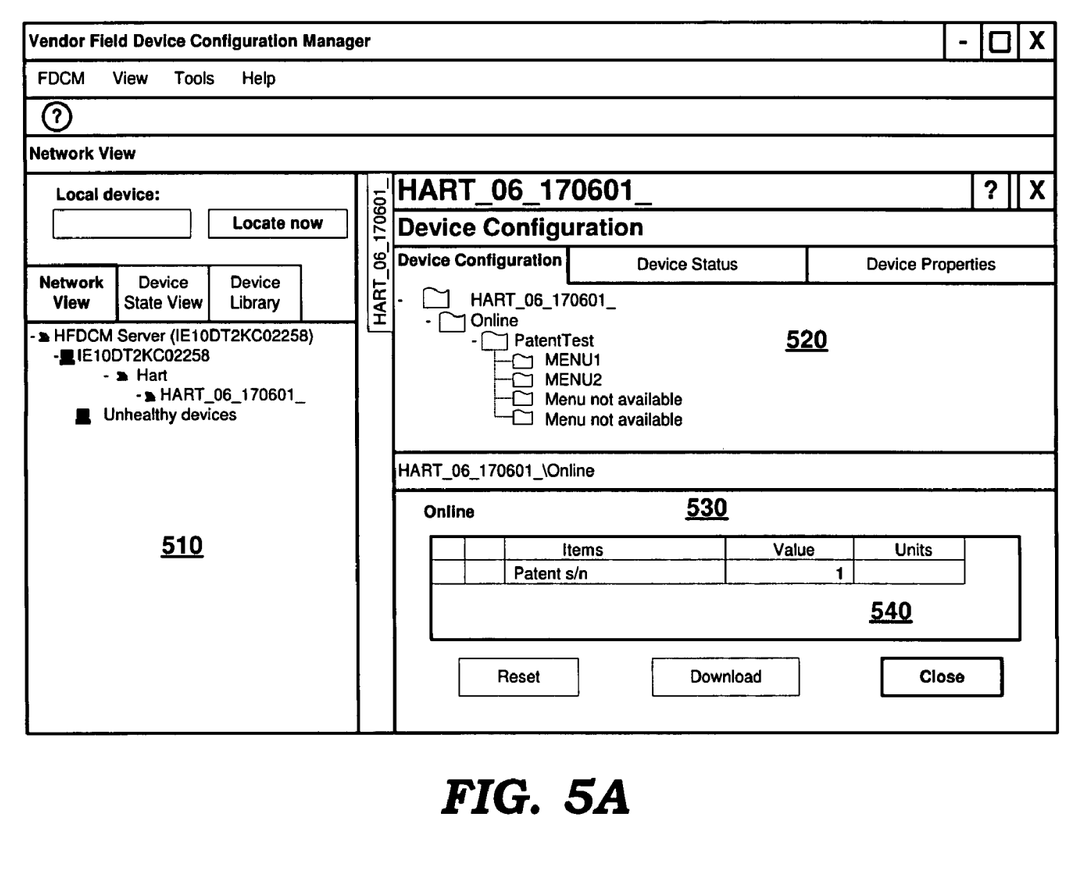
FIGS. 5A and 5B contain different tree structures illustrating the dynamic menus displayed in an embodiment.
Figure 5B:
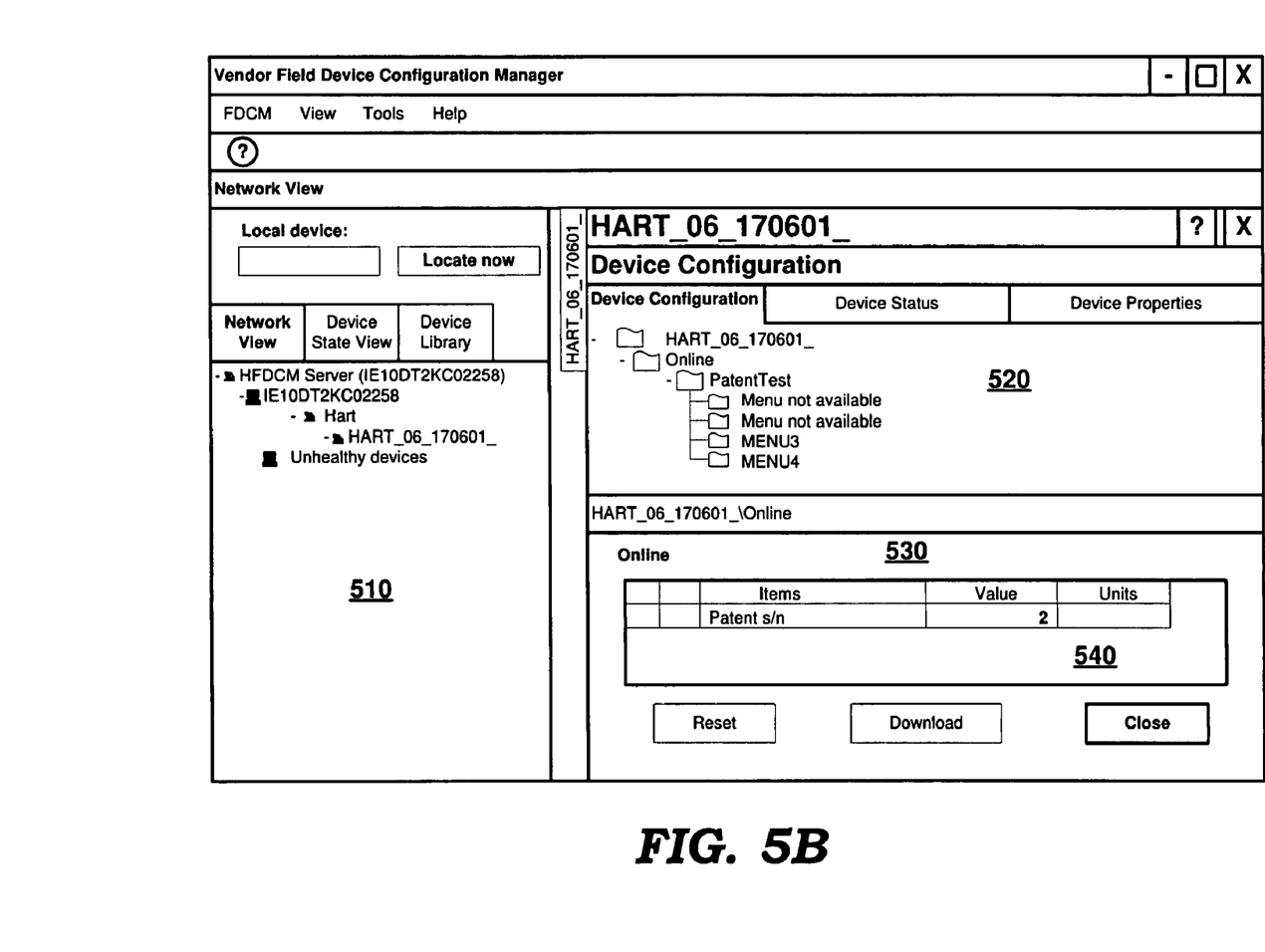

Continuing now with respect to FIGS. 5A and 5B, the display is shown containing four portions 510, 520, 530 and 540. As may be appreciated portions 520 contains different menus in FIGS. 5A and 5B. That is, portion 520 of FIG. 5A contains menu1, menu2, 'Menu not available' and 'Menu not available' as the sub-menus of PatentTest, while portion 520 of FIG. 5B contains 'Menu not available', 'Menu not available', menu3 and menu4 as sub-menus of PatentTest. It may be further noted that the hierarchy (as relevant in the present context) of the tree portion is HART_06_170601_, Online, PatentTest, and the sub-menus (as noted earlier). The manner in which the DD causes the menus of FIGS. 5A and 5B to be provided, is described below with reference to FIGS. 4A-4C.

Continuing now with reference to the DD of FIGS. 4A-4C, in general, a vendor provides the device description in a file (DD file), which needs be parsed consistent with the conventions of encoding the device description. Often, the file is provided in binary format. However, for understandability the encoded DD is included in the present application. The content of FIGS. 4A and 4B represents a portion of device description corresponding to the tree portion starting from Online in portion 520 of FIGS. 5A and 5B. FIG. 4C provides the details of the variables used in the menus.

Continuing now with combined reference to FIGS. 4A-4C and 5A-5B, lines 401A-416A represent a description for an information element of type menu (i.e., defining a sub-tree portion), with an identifier of root_menu. The label is set to Online in line 408A, and the display in portion 520 is seen to be consistent. Line 409A defines the start point of the menu items list, and two items are shown as patent and pos_serial_number in lines 411A and 412A respectively. The definitions of items patent and pos_serial_number is provided starting at lines 418A and 421C, as described below in further detail.

Lines 418A-428A provide description for information element Patent. Line 418A defines the element as a menu, and label for the patent menu is provided as "Patent Test" at line 420A. Description at lines 421A-427A lists four items under menu "Patent Test" having identifiers menu_test1, menu_test2, menu_test3 and menu_test4, which are respectively defined starting at line numbers 430A, 401B, 418B, and 435B, as described below.

Lines 430A-446A provides description for the item menu_test1. Line 430A identifies the item as being of menu type. Lines 432A-440A define the label value depending on the value of a variable pos_serial_number. Line 435A indicates that the label equals MENU1 (as shown in FIG. 5A) if pos_serial_number equals 1, and line 439A indicates that the label equals"Menu not available" (FIG. 5B) otherwise. Lines 442A-446A indicate that an item identified by an information element with identifier pos_value (defined starting at 409C) is provided as a list associated with the displayed label.

Continuing with the description of FIG. 4B, lines 401B-416B, 418B-433B, and 435-450B respectively provide description for information elements having identifiers menu_test2, menu_test3, and menu_test4 similar to lines 430A-446A. The description of each information element provided with reference to menu_test1, for conciseness.

The labels displayed for menu_test2, menu_test3, and menu_test4 depend on whether pos_serial_number respectively equals to 1 (line 404B), 2 (line 421B), and 2 (line 438B). Menu_test2 causes label MENU2 to be displayed if pos_serial_number equals 1, and "Menu not available" otherwise. Menu_test3 causes label MENU3 to be displayed if pos_serial_number equals 2, and "Menu not available" otherwise. Menu_test4 causes label MENU4 to be displayed if pos_serial_number equals 2, and "Menu not available" otherwise. In addition, each information element associates variable pos_value with the displayed label.

From the above, it may be appreciated that pos_serial_number represents a variable, whose value determines the menu/tree structure. In addition, the value associated with a menu item is defined by variable pos_value. The information elements corresponding to the two variables are described below with reference to FIG. 4C.

Continuing with reference to FIG. 4C, lines 401C-407C describes an information element as being a variable with identifier private_label_distributor, having enumerated static values equaling 23 and "Vendor".

Lines 409C-419C provide the description of variable pos_value. When the variable is selected and printed, a label "Position" (line 413C) is to be displayed in portion 540, the value is to be read from the field device (line 414C), and is to be displayed as floating number with a format of 0.2 f (line 417C).

Lines 421C-432C provides the description of variable pos_serial_number. Line 426C indicates the corresponding values are to be read from the device and that the value can be written, line 427C indicates that the values are of unsigned integer type, line 429C indicates that the variable is to be displayed with a format of "7d" (seven digits), along with the label indicated in line 425C while line 430C indicates that a user interface should allow the value to be edited/ in the "7d" format.

Accordingly, when a user selects the label Online, consistent with line 412A, the value of pos_serial_number is displayed according to the definition in lines 421C-432C in portion 540 of FIGS. 5A and 5B. In FIG. 5A, MENU1, MENU2, "Menu not available" and "Menu not available" are shown displayed as the items below PatentTest corresponding to a value of 1 (in portion 540) for pos_serial_number. On the other hand, in FIG. 5B, "Menu not available", "Menu not available", MENU3, and MENU4 are shown displayed as the items below PatentTest corresponding to a value of 2 (in portion 540) for pos_serial_number.

Thus, in operation, when a user selects Online, the corresponding central server 150 receives a subscription request for the corresponding information element (i.e., the tree portion defined for that element). Central server 150 parses the DD to determine that the value of pos_serial_number is to be retrieved from the corresponding field device, retrieves the value, and sends a menu structure and values for display on client system 180A.

As noted above, central server 150 stores the tree structure and the values to enable historical menu information to be provided later. The data stored is described in further detail below with respect to the examples of FIGS. 4A-4C and 5A-5B.

6. Storing Data to Enable Historical Menu Display

The data to be stored can be appreciated by understanding the various components of a displayed menu. In general, there is a template containing various portions (e.g., 510, 520, and 540), and menus are displayed in each portion. Within each displayed menu, there are labels with defined hierarchies (e.g., PatentTest as the only sub-element of Online, and Pat-enttest containing four sub-elements). In addition, there are optional items (label value combination, e.g., as shown in portion 540) that are associated with selected labels.

It is assumed that a user will have access to the same templates as those used for display in real-time (during operation). Accordingly, to enable historical display, it may be sufficient to store the labels displayed, the relationships among the labels, and the item values associated with each labels. Such a set of data is stored periodically or when any value changes (in database server s170). A time stamp may be stored associated with each set of data.

Thus, when a user indicates a device of interest, a time point of interest and a menu portion of interest, central server 150 retrieves the corresponding (portion of) data set, and causes a display to be generated on client system 180A (similar to how the display is generated during operation).

In one embodiment, the local copy of the DD (for client system 180A) is maintained in XML format, with the XML format specifying the display structure, labels, hierarchies and values using appropriate tags. The XML format identifies each information element (including (sub-)menus by corresponding unique identifiers). Client system 180A subscribes to specific menus by sending the corresponding identifiers, and central server 150 responds back with XML data indicating the menu structure, labels and values.

Accordingly, the copy of the DD file accessed by central server 150 also needs to have the same identifiers for corresponding information elements. Client system 180A integrates the received information with the information in the local copy of the DD file, and generates the desired display.

While the above description is provided in relation to displaying historical menus for a field device of interest at a given time, another aspect of the present invention enables the display of multiple historical menus, thereby facilitating status comparison. A user may specify two different devices with the same time stamp, or different time stamps for the same device, as desired.

Various embodiments of client systems 180A-180Y and central server 150 can be implemented using the description provided above. An example embodiment, in which various aspects of the invention are operative by execution of software instruction, is described below in further detail.

7. Software Implementation

Figure 6:
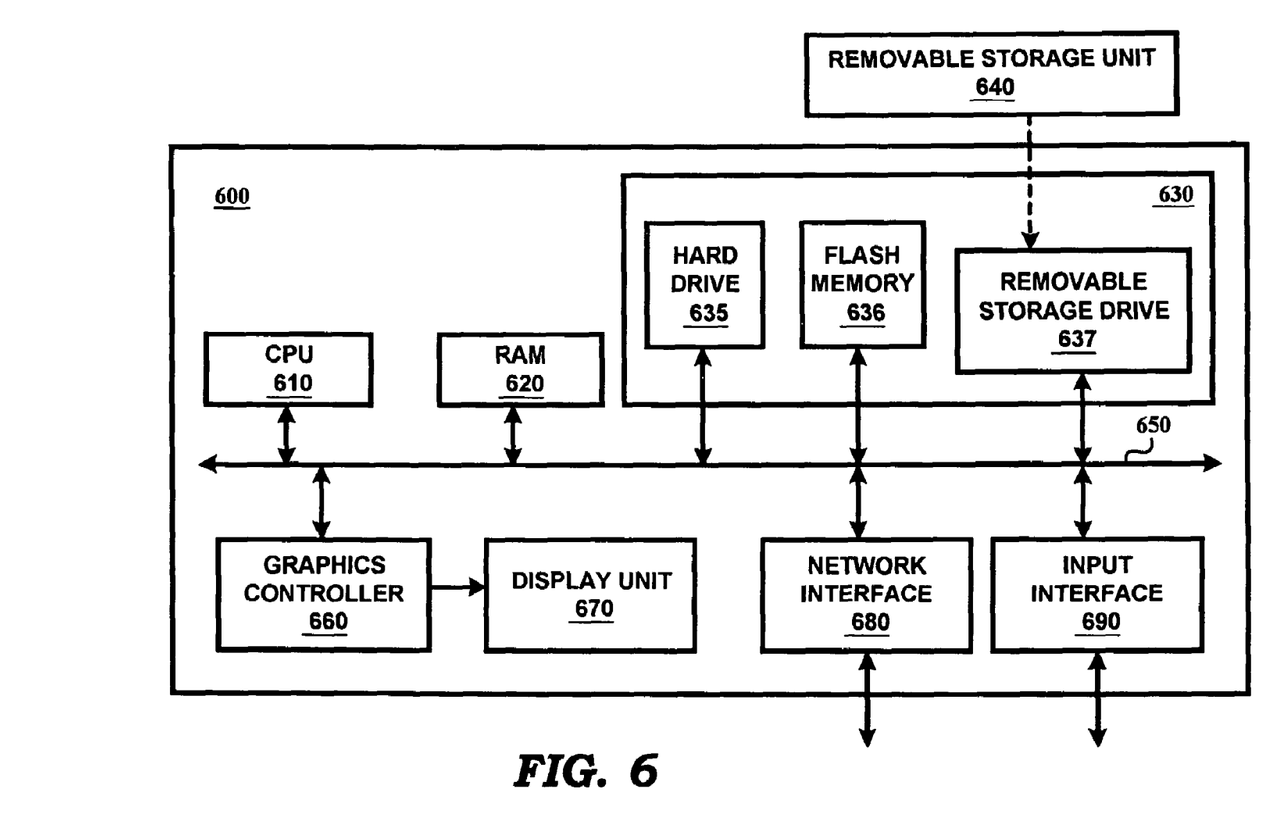
FIG. 6 is a block diagram illustrating the details of digital processing system implemented substantially in the form of software in an embodiment of the present invention.

FIG. 6 is a block diagram illustrating the details of digital processing system 600 implemented substantially in the form of software in an embodiment of the present invention. System 600 may correspond to one of client systems 180A-180Y and central server 150. System 600 may contain one or more processors such as central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general purpose processing unit. RAM 620 may receive instructions from secondary memory 630 using communication path 650.

Graphics controller 660 generates display signals (e.g., in RGB format) to display unit 570 based on data/instructions received from CPU 610. Display unit 670 contains a display screen to display the images defined by the display signals. Input interface 690 may correspond to a key-board and/or mouse. In case of client systems 180A-180Y, the input/output devices enable a suitable user interface, using which users may manage field devices.

Network interface 680 provides the physical, electrical and protocol interfaces needed for each system. In the case of client systems 180A-180Y, a network connection to communicate on a local area network (to which central server 150 is also connected) using protocols such as TCP/IP may be sufficient. On the other hand, in case of central server 150, in addition to such a network connection, a control network connection to interface with control network 130 may be necessary.

Secondary memory 630 may contain hard drive 635, flash memory 636 and removable storage drive 637. Secondary memory 630 may store the data and software instructions, which enable system 600 to provide several features in accordance with the present invention. Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data.

In this document, the term "computer program product" is used to generally refer to removable storage unit 640 or hard disk installed in hard drive 635. These computer program products are means for providing software to system 600. CPU 610 may retrieve the software instructions, and execute the instructions to provide various features of the present invention described above.

8. Conclusion

While various embodiments of the present invention have been described above, it should be understood that they have beer (presented by way of example only, and not limitation. Thus, the breadth and scope of the present invention should not be limited by any of the above described exemplary embodiments, but should be defined only in accordance with the following claims and their equivalents.

What is claimed is:

1. A method of enabling a user to manage a plurality of field cevices contained in a process control plant, said method comprising:

receiving from said user inputs indicating a first time point, a tree portion, and a field device of interest, said field device of interest being contained in said plurality of field devices, wherein said tree portion has a different tree structure depending on a value of a variable in said field device of interest at a corresponding time point according to a device description provided for said field device of interest, wherein said device description specifies a plurality of information elements related to said field device of interest, wherein said device description further specifies that said tree portion has a first tree structure when said variable has a first value and a second tree structure when said variable has a second value, wherein said first tree structure has a first set of information elements and said second tree structure has a second set of information elements such that the value of said variable at a time point determines the structure of said tree portion at that time point, wherein said device description indicates that the value for said variable is to be retrieved from said field device;

retrieving from a data storage data representing a third tree structure corresponding to said tree portion at said first time point for said field device, said third tree structure equaling said first tree structure if said variable has said first value at said first time point and equaling said second tree structure if said variable has said second value at said first time point; and displaying said third tree structure as a menu, enabling said user to navigate said menu, which permits said user to select said variable for display, whereby said first tree structure is displayed for said menu if said first value was retrieved for said variable at said first time point and said second tree structure is displayed for said menu if said second value was retrieved for said variable at said first time point.

2. The method of claim 1, further comprising:

monitoring said field device for said value of said variable at a plurality of time points including said first time point;

determining a plurality of tree structures, with each tree structure corresponding to a corresponding one of said plurality of time points according to said device description of said field device;

storing in said data storage each of said plurality of tree structures associated with the coresponding one of said plurality of time points, wherein said storing stores said first tree structure if said first value was retrieved for said variable at said first time point and said second tree structure is displayed for said menu if said second value was retrieved for said variable at said first time point, whereby said menu displayed by said displaying is identical to a menu displayed at said first time point.

3. The method of claim 2, wherein said monitoring, said determining and said storing are performed in response to said user selecting said variable for display.

4. The method of claim 2, wherein said device description specifies a corresponding set of labels comprised in corresponding information elements for each of said plurality of tree structures, said storing stores in said data storage said set of labels and said associated values corresponding to each of said plurality of tree structures, said retrieving retrieves from said data storage said set of labels and said associated values corresponding to said tree structure, said displaying displays said retrieved set of labels and said associated values as said menu such that said menu, including said retrieved set of labels, is identical to a menu displayed at said first time point.

5. A method of enabling a user to manage a plurality of field devices contained in a process control plant, said method comprising:

monitoring a field device to determine a plurality of values of a variable in said field device at a corresponding plurality of time points, wherein a device description related to said field device indicates that the value for said variable is to be retrieved from said field device;

determining a plurality of tree structures for a tree portion related to said field device, with each tree structure corresponding to a corresponding one of said plurality of time points according to said device description of said field device, wherein said tree portion has a different tree structure depending on a value of said variable in said field device at a corresponding time point according to said device description provided for said field device, wherein said device description specifies a plurality of information elements related to said field device, wherein said device description further specifies that said tree portion has a first tree structure when said variable has a first value and a second tree structure when said variable has a second value, wherein said first tree structure has a first set of information elements and said second tree structure has a second set of information elements such that the value of said variable at a corresponding time point determines the structure of said tree portion at that time point, wherein said first value and said second value are contained in said plurality of values;

storing data representing said plurality of tree structures associated with said plurality of values in a non-volatile storage such that each of said plurality of tree structures is displayed later as a corresponding menu; and enabling said user to navigate said menu, which permits said user to select said variable for display, wherein said first tree structure has a first set of labels and said second tree structure has a second set of labels, the values of said variable associated with said first tree structure and said second tree structure being unequal and said first set of labels being different from said second set of labels, wherein said storing stores in said data storage said first set of labels associated with said first tree structure and said second set of labels with said second tree structure.

6. The method of claim 5, wherein said storing further stores each of said plurality of time points as a time stamp associated with each of said plurality of tree structures.

7. The method of claim 6, further comprising:

receiving a request to provide said menu which was valid at a first time point;

retrieving a third tree structure stored in said non-volatile storage, said first tree structure being contained in said plurality of tree structures and being stored associated with said first time point, said third tree structure equaling said first tree structure if said variable has said first value at said first time point and equaling said second tree structure if said variable has said second value at said first time point; and sending said third tree structure to enable said menu to be displayed to a user causing said request to be issued.

8. The method of claim 5, said method further comprises:

receiving a subscription request for an information element corresponding to said menu; and parsing said device description to determine that said variable determines the tree structure of said menu, wherein said monitoring, said determining and said storing are performed in response to said receiving of said subscription request.

9. A computer readable storage medium storing one or more sequences of instructions for causing a system to enable a user to manage a plurality of field devices contained in a process control plant, wherein execution of said one or more sequences of instructions by one or more processors contained in said system causes said system to perform the actions of:

receiving from said user inputs indicating a first time point, a tree portion, and a field device of interest, said field device of interest being contained in said plurality of field devices, wherein said tree portion has a different tree structure depending on a value of a variable in said field device of interest at said a corresponding time point according to a device description provided for said field device of interest, wherein said device description specifies a plurality of information elements related to said field device of interest, wherein said device description further specifies that said tree portion has a first tree structure when a said variable has a first value and a second tree structure when said variable has a second value, wherein said first tree structure has a first set of information elements and said second tree structure has a second set of information elements such that the value of said variable at a time point determines the structure of said tree portion at that time point, wherein said device description indicates that the value for said variable is to be retrieved from said field device;

retrieving from a data storage data representing a third tree structure corresponding to said tree portion at said first time point for said field device, said third tree structure equaling said first tree structure if said variable has said first value at said first time point and equaling said second tree structure if said variable has said second value at said first time point; and displaying said third tree structure as a menu, enabling said user to navigate said menu, which permits said user to select said variable for display, whereby said first tree structure is displayed for said menu if said first value was retrieved for said variable at said first time point and said second tree structure is displayed for said menu if said second value was retrieved for said variable at said first time point.

10. The computer readable storage medium of claim 9, further comprising:

monitoring said field device for said value of said variable at a plurality of time points including said first time point;

determining a plurality of tree structures, with each tree structure corresponding to a corresponding one of said plurality of time points according to said device description of said field device;

storing in said data storage each of said plurality of tree structures associated with the corresponding one of said plurality of time points, wherein said storing stores said first tree structure if said first value was retrieved for said variable at said first time point and said second tree structure is displayed for said menu if said second value was retrieved for said variable at said first time point, whereby said menu displayed by said displaying is identical to a menu displayed at said first time point.

11. The computer readable storage medium of claim 10, wherein said monitoring, said determining and said storing are performed in response to said user selecting said variable for display.

12. The computer readable storage medium of claim 10, wherein said device description specifies a corresponding set of labels comprised in corresponding information elements for each of said plurality of tree structures, said storing stores in said data storage said set of labels and said associated values corresponding to each of said plurality of tree structures, said retrieving retrieves from said data storage said set of labels and said associated values corresponding to said tree structure, said displaying displays said retrieved set of labels and said associated values as said menu such that said menu, including said retrieved set of labels, is identical to a menu displayed at said first time point.

13. A computer readable storage medium storing one or more sequences of instructions for causing a server to enable a user to manage a plurality of field devices contained in a process control plant, wherein execution of said one or more sequences of instructions by one or more processors contained in said server causes said server to perform the actions of:

monitoring a field device to determine a plurality of values of a variable in said field device at a corresponding plurality of time points, wherein a device description related to said field device indicates that the value for said variable is to be retrieved from said field device;

determining a plurality of tree structures for a tree portion related to said field device, with each tree structure corresponding to a corresponding one of said plurality of time points according to said device description of said field device, wherein said tree portion has a different tree structure depending on a value of said variable in said field device at a corresponding time point according to said device description provided for said field device, wherein said device description specifies a plurality of information elements related to said field device, wherein said device description further specifies that said tree portion has a first tree structure when a variable has a first value and a second tree structure when said variable has a second value, wherein said first tree structure has a first set of information elements and said second tree structure has a second set of information elements such that the value of said variable at a corresponding time point determines the structure of said tree portion at that time point, wherein said first value and said second value are contained in said plurality of values;

storing data representing said plurality of tree structures associated with said plurality of values in a non-volatile storage such that each of said plurality of tree structures is displayed later as a corresponding menu; and enabling said user to navigate said menu, which permits said user to select said variable for display, wherein said first tree structure has a first set of labels and said second tree structure has a second set of labels, the values of said variable associated with said first tree structure and said second tree structure being unequal and said first set of labels being different from said second set of labels, wherein said storing stores in said data storage said first set of labels associated with said first tree structure and said second set of labels with said second tree structure.

14. The computer readable storage medium of claim 13, wherein said storing further stores each of said plurality of time points as a time stamp associated with each of said plurality of tree structures.

15. The computer readable storage medium of claim 14, further comprising one or more instructions for:

receiving a request to provide said menu which was valid at a first time point;

retrieving a third tree structure stored in said non-volatile storage, said first tree structure being contained in said plurality of tree structures and being stored associated with said first time point, said third tree structure equaling said first tree structure if said variable has said first value at said first time point and equaling said second tree structure if said variable has said second value at said first time point; and sending said third tree structure to enable said menu to be displayed to a user causing said request to be issued.

16. The computer readable storage medium of claim 13, further comprises one or more instructions for:

receiving a subscription request for an information element corresponding to said menu; and parsing said device description to determine that said variable determines the tree structure of said menu, wherein said monitoring, said determining and said storing are performed in response to said receiving of said subscription request.

17. A process control plant comprising:

a data storage;

a plurality of field devices including a first field device;

a client system to send a request indicating a first time point, a tree portion, and said first field device in response to a user action;

a central server operable to:

parse a device description of said first field device, wherein said device description specifies a plurality of information elements related to said first field device, wherein said device description further specifies that said tree portion has a first tree structure when a variable of said first field device has a first value and a second tree structure when said variable has a second value, wherein said first tree structure has a first set of information elements and said second tree structure has a second set of information elements such that the value of said variable at a time point determines the structure of said tree portion at that time point, wherein said device description indicates that the value for said variable is to be retrieved from said first field device;

monitor said first field device to retrieve a plurality of values of said variable in said first field device at a corresponding plurality of time points;

determine a plurality of tree structures, with each of said plurality of tree structures corresponds to a corresponding one of said plurality of time points according to said device description of said first field device, wherein a tree structure of said plurality of tree structures equals said first tree structure when said variable in the corresponding time point equals said first value and equals said second tree structure when said variable in the corresponding time point equals said second value, store data representing said plurality of tree structures associated with said plurality of time points in said data storage;

receive said request from said client system after operating to perform said parse, said monitor, said determine and said store;

retrieve from said data storage a third tree structure stored associated with said time point for said first field device, said third tree structure equaling said first tree structure if said variable has said first value at said first time point and equaling said second tree structure if said variable has said second value at said first time point;

send said third tree structure to said client system in response to said receive, wherein said client system receives said third tree structure and displays said third tree structure in the form of a menu in response to said user action, whereby said first tree structure is displayed for said menu if said first value was retrieved for said variable at said first time point and said second tree structure is displayed for said menu if said second value was retrieved for said variable at said first time point.

* * * * *